(12) United States Patent
Kim et al.

(10) Patent No.: US 12,529,445 B2
(45) Date of Patent: Jan. 20, 2026

(54) ROLLABLE DISPLAY DEVICE COMPRISING AN INNER ROLLER WITHIN AN OUTER ROLLER

(71) Applicant: LG Display Co., Ltd., Seoul (KR)

(72) Inventors: ByungHee Kim, Anyang-si (KR); GeunChang Park, Goyang-si (KR); YongSuk Kim, Paju-si (KR); Jun Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 298 days.

(21) Appl. No.: 18/082,982

(22) Filed: Dec. 16, 2022

(65) Prior Publication Data

US 2023/0213140 A1     Jul. 6, 2023

(30) Foreign Application Priority Data

Dec. 31, 2021   (KR) ........................ 10-2021-0194021

(51) Int. Cl.
| | |
|---|---|
| *F16M 11/04* | (2006.01) |
| *F16M 11/18* | (2006.01) |
| *G06F 1/16* | (2006.01) |
| *H05K 5/02* | (2006.01) |

(52) U.S. Cl.
CPC .......... *F16M 11/046* (2013.01); *F16M 11/18* (2013.01); *H05K 5/0247* (2013.01); *G06F 1/1652* (2013.01)

(58) Field of Classification Search
CPC .... F16H 1/00; F16H 1/20; F16M 1/00; F16M 2200/00; G06F 1/00; G06F 9/00; G06F 1/16–1652; H05K 5/00–0217; G09F 9/30–301

USPC ........ 361/679.01, 679.02, 679.21, 748, 752, 361/755, 756
See application file for complete search history.

(56) References Cited

U.S. PATENT DOCUMENTS

| | | | |
|---|---|---|---|
| 10,143,096 B2 * | 11/2018 | Park ..................... | H05K 5/0217 |
| 10,347,160 B2 * | 7/2019 | Takayanagi ............. | G09F 9/301 |
| 11,064,608 B2 * | 7/2021 | Choi ..................... | H05K 5/0217 |
| 2010/0319340 A1 * | 12/2010 | Wickett ................ | F03B 13/182 |
| | | | 74/731.1 |

(Continued)

FOREIGN PATENT DOCUMENTS

| | | |
|---|---|---|
| KR | 10-2010-0122096 A | 11/2010 |
| KR | 10-2020-0063774 A | 6/2020 |

OTHER PUBLICATIONS

Fred Herbert Colvin; Frank Arthur Stanley. American Machinists' Handbook and Dictionary of Shop Terms: A Reference Book of math Shop and Drawing Room Data, Methods and Definitions. McGraw-Hill book Company, Incorporated. p. 121. (1914). (Year: 1914).*

*Primary Examiner* — Anthony Q Edwards
*Assistant Examiner* — Ross Terry Mularski
(74) *Attorney, Agent, or Firm* — Fenwick & West LLP

(57) ABSTRACT

According to an aspect of the present disclosure, a display device includes a display unit which includes a display panel and a back cover supporting a rear surface of the display panel; an external roller configured to wind or unwind the display unit; an inner roller in the outer roller; and an intermediate gear which interworks a rotation of the outer roller with a rotation of the inner roller, and responsive to the display unit being wound or unwound, the outer roller and the inner roller rotate in opposite directions, by the intermediate gear.

10 Claims, 10 Drawing Sheets

(56) References Cited

U.S. PATENT DOCUMENTS

| | | | |
|---|---|---|---|
| 2013/0057782 A1* | 3/2013 | Takahashi | H05K 5/00 |
| | | | 361/679.01 |
| 2013/0077236 A1* | 3/2013 | Becze | G09G 1/00 |
| | | | 361/679.56 |
| 2019/0064578 A1* | 2/2019 | Cho | H10K 77/111 |
| 2020/0170114 A1 | 5/2020 | Choi et al. | |
| 2020/0396850 A1* | 12/2020 | Kim | H05K 5/0217 |

* cited by examiner

ROLLABLE DISPLAY DEVICE COMPRISING AN INNER ROLLER WITHIN AN OUTER ROLLER

CROSS-REFERENCE TO RELATED APPLICATION

This application claims the priority of Republic of Korea Patent Application No. 10-2021-0194021 filed on Dec. 31, 2021, in the Korean Intellectual Property Office, which is hereby incorporated by reference in its entirety.

BACKGROUND

Field

The present disclosure relates to a display device, and more particularly, to a rollable display device which is capable of displaying images even in a rolled state.

Description of the Related Art

As display devices which are used for a monitor of a computer, a television, or a cellular phone, there are an organic light emitting display device (OLED) which is a self-emitting device and a liquid crystal display device (LCD) which requires a separate light source.

An applicable range of the display device is diversified to personal digital assistants as well as monitors of computers and televisions and a display device with a large display area and a reduced volume and weight is being studied.

Further, recently, a rollable display device which is manufactured by forming a display element and a wiring line on a flexible substrate such as plastic which is a flexible material so as to be capable of displaying images even in a rolled state is getting attention as a next generation display device.

SUMMARY

An object to be achieved by the present disclosure is to provide a display device which is capable of reducing the tangle of the cable which is inserted into an inner roller by restricting the movement of the inner roller when the display device is wound or unwound.

Another object to be achieved by the present disclosure is to provide a display device which improves an electromagnetic interference (EMI) noise which is generated in a printed circuit board and a cable which is inserted in the roller.

Objects of the present disclosure are not limited to the above-mentioned objects, and other objects, which are not mentioned above, can be clearly understood by those skilled in the art from the following descriptions.

In order to achieve the above-described objects, according to an aspect of the present disclosure, a display device includes a display unit which includes a display panel and a back cover supporting a rear surface of the display panel; an external roller configured to wind or unwind the display unit; an inner roller which is accommodated in the outer roller; and an intermediate gear which interworks the rotation of the outer roller with the rotation of the inner roller, and when the display unit is wound or unwound, the outer roller and the inner roller rotate in opposite directions, by the intermediate gear.

Other detailed matters of the exemplary embodiments are included in the detailed description and the drawings.

According to the present disclosure, an inner roller is configured to accommodate the printed circuit board and to be connected to the cable so as to reversely rotate with respect to an outer roller, thereby restricting the movement of the inner roller when the display device is wound or unwound.

According to the present disclosure, when the display device is wound or unwound, a cable which is inserted into the roller is disposed to be spaced apart from the roller to minimize the electromagnetic interference (EMI) noise.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1A:
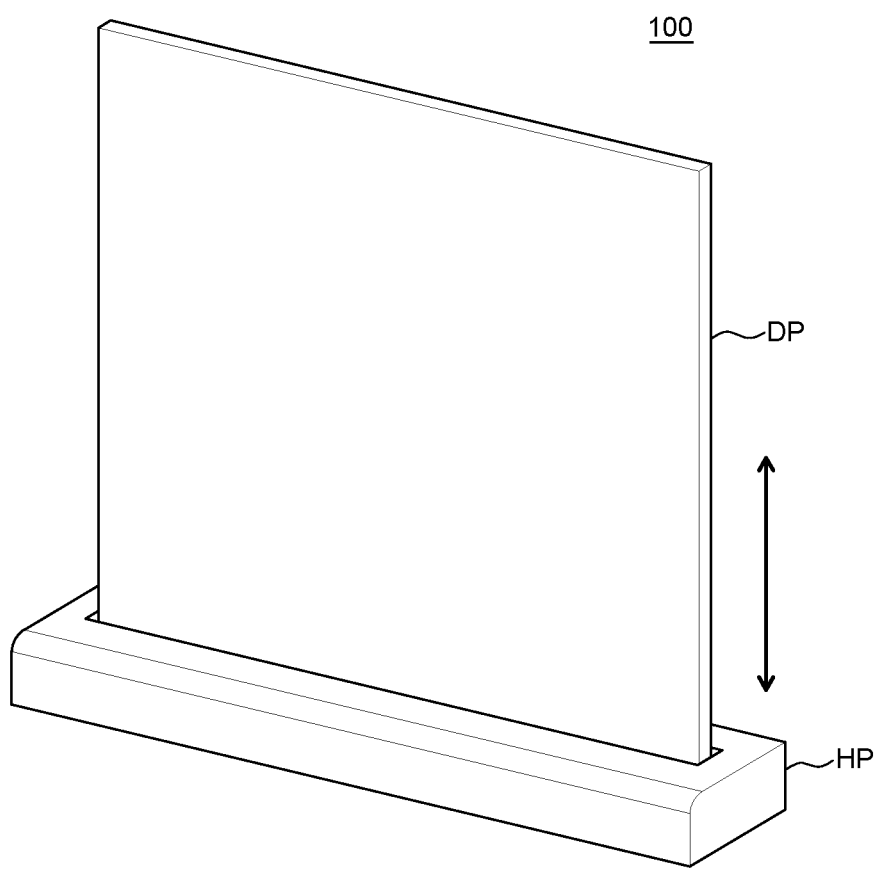
FIGS. 1A and 1B are perspective views of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to accompanying drawings.

<Display Device-Rollable Display Device>

A rollable display device may be referred to as a display device which is capable of displaying images even though the display device is rolled. The rollable display device may have a high flexibility as compared with a general display device of the related art. Depending on whether to use a rollable display device, a shape of the rollable display device may freely vary. Specifically, when the rollable display device is not used, the rollable display device is rolled to be stored with a reduced volume. In contrast, when the rollable display device is used, the rolled rollable display device is unrolled to be used.

Figure 1B:
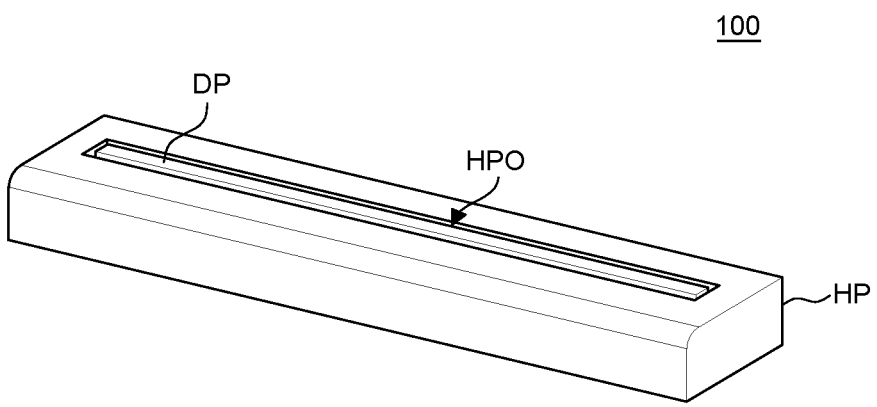

FIGS. 1A and 1B are perspective views of a display device according to an exemplary embodiment of the present disclosure. Referring to FIGS. 1A and 1B, a display device according to an exemplary embodiment of the present disclosure includes a display unit DP and a housing unit HP.

The display unit DP is a configuration for displaying images to a user and for example, in the display unit DP, a display element and a circuit, a wiring line, and a component for driving the display element may be disposed. In this case, since the display device 100 according to the exemplary embodiment of the present disclosure is a rollable display device 100, the display unit DP may be configured to be wound and unwound. For example, the display unit DP may be formed of a display panel 120 and a first cover 110a each having a flexibility to be wound or unwound. The display unit DP will be described below in more detail with reference to FIGS. 4A and 4B.

The housing unit HP is a case in which the display unit DP is accommodated. The housing unit HP has an opening HPO to allow the display unit DP to move to the inside and the outside of the housing unit HP.

In the meantime, the display unit DP of the display device 100 may be switched from a fully unwound state as illustrated in FIG. 1A to a fully wound state as illustrated in FIG. 1B or from a fully wound state to a fully unwound state.

In order to switch the display unit DP to a fully unwound state or a fully wound state, a driving unit MP which winds or unwinds the display unit DP is disposed.

<Driving Unit>

Figure 2:
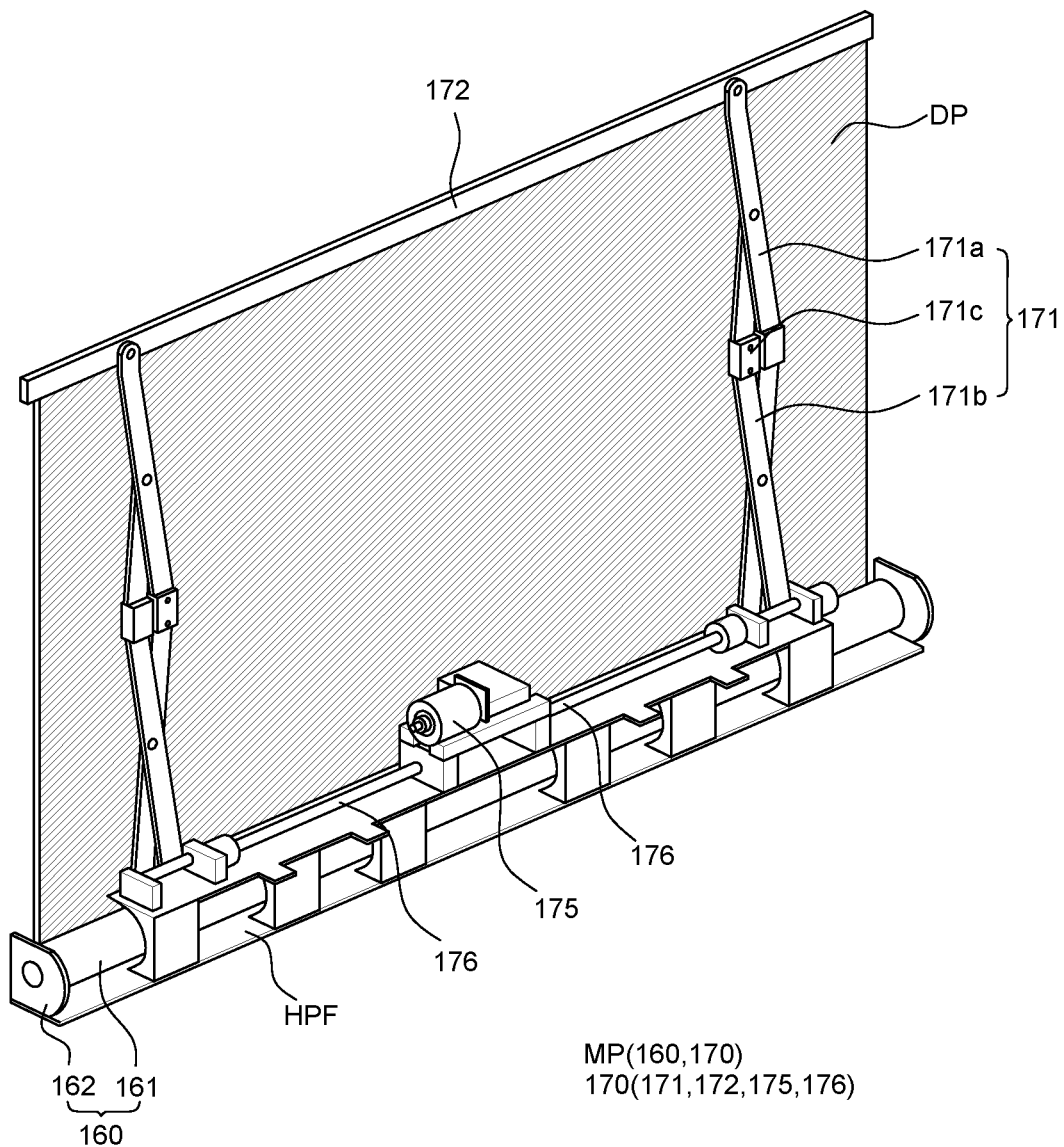
FIG. 2 is a perspective view of a display device according to an exemplary embodiment of the present disclosure.
Figure 3:
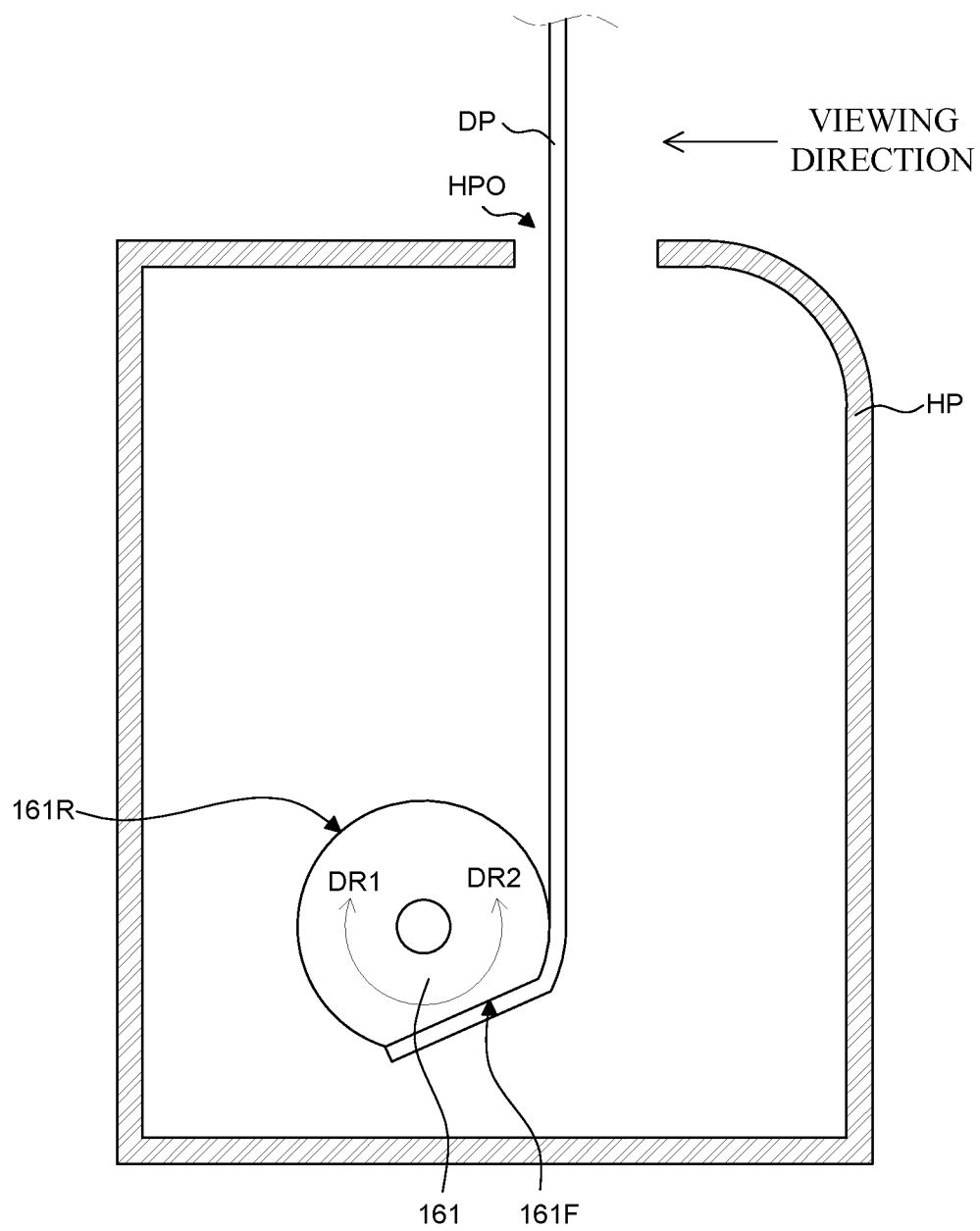
FIG. 3 is a schematic cross-sectional view of a display device according to an exemplary embodiment of the present disclosure.

FIG. 2 is a perspective view of a display device according to an exemplary embodiment of the present disclosure. FIG. 3 is a schematic cross-sectional view of a display device according to an exemplary embodiment of the present disclosure. FIG. 3 is a schematic cross-sectional view for explaining a roller 161 and a display unit DP of a display device 100 according to an exemplary embodiment of the present disclosure. For the convenience of description, in FIG. 3, a housing unit HP, a roller 161, and a display unit DP are illustrated.

First, referring to FIG. 2, the driving unit MP includes a roller unit 160 and a lifting unit 170.

The roller unit 160 rotates in a clockwise direction or a counterclockwise direction to wind or unwind the display unit DP fixed to the roller unit 160. The roller unit 160 includes an outer roller 161 and a roller support unit 162.

The outer roller 161 is a member around which the display unit DP is wound. The outer roller 161 may be, for example, formed to have a cylindrical shape. A lower edge of the display unit DP may be fixed to the outer roller 161. When the outer roller 161 rotates, the display unit DP which is fixed to the outer roller 161 through the lower edge may be wound around the outer roller 161. In contrast, when the outer roller 161 rotates in an opposite direction, the display unit DP which is wound around the outer roller 161 may be unwound from the outer roller 161.

Referring to FIG. 3, the outer roller 161 may be formed to have a cylindrical shape in which at least a part of an outer circumferential surface is flat and the remaining part of the outer circumferential surface is curved. Even though the outer roller 161 may have entirely a cylindrical shape, a part thereof may be formed of a flat surface. That is, a part of the outer circumferential surface of the outer roller 161 is formed to be flat and the remaining part of the outer circumferential surface is formed as a curved surface. For example, the outer roller 161 is configured by a curved portion 161R and a flat portion 161F and in the flat portion 161F of the outer roller 161, the plurality of flexible films and the printed circuit board of the display unit DP are seated. However, the outer roller 161 may have a completely cylindrical shape or an arbitrary shape which may wind the display unit DP, but is not limited thereto.

Referring to FIG. 2 again, the roller support unit 162 supports the outer roller 161 at both sides of the outer roller 161. Specifically, the roller support unit 162 is disposed on a bottom surface HPF of the housing unit HP. Side surfaces of the roller support unit 162 are coupled to both ends of the outer roller 161. By doing this, the roller support unit 162 may support the outer roller 161 to be spaced apart from the bottom surface HPF of the housing unit HP. In this case, the outer roller 161 may be rotatably coupled to the roller support unit 162.

The lifting unit 170 moves the display unit DP in a vertical direction in accordance with the driving of the roller unit 160. The lifting unit 170 includes a link unit 171, a head bar 172, a motor 175, and a rotary unit 176.

The link unit 171 of the lifting unit 170 includes a plurality of links 171a and 171b and a hinge unit 171c which connects the plurality of links 171a and 171b to each other. Specifically, the plurality of links 171a and 171b includes a first link 171a and a second link 171b and the first link 171a and the second link 171b cross each other in the form of scissors to be rotatably fastened by means of the hinge unit 171c. The link unit 171 may be configured by a plurality of intersecting links 171a and 171b, but the number of links is not limited so that the link unit may be configured by a single link. When the link unit 171 moves in the vertical direction, the plurality of links 171a and 171b may rotate to be far away from each other or close to each other. The link unit 171 may be configured by a plurality of intersecting links 171a and 171b, but it is not limited thereto so that the link unit may be configured by a single link which does not cross.

The head bar 172 of the lifting unit 170 is fixed to an uppermost end of the display unit DP. The head bar 172 is coupled to the link unit 171 to move the display unit DP in the vertical direction in accordance with the rotation of the plurality of links 171a and 171b of the link unit 171. That is, the display unit DP may move in a vertical direction by the head bar 172 and the link unit 171.

The head bar 172 covers a part of a surface which is adjacent to an uppermost edge of the display unit DP so as not to hide an image displayed on the front surface of the display unit DP. The display unit DP and the head bar 172 may be fixed by a screw, but are not limited thereto.

The motor 175 is connected to a power generating unit, such as a separate external power source or a built-in battery, to be supplied with the power. The motor 175 generates a torque to provide a driving force to the rotary unit 176.

The rotary unit 176 is connected to the motor 175 to be configured to convert a rotational motion from the motor 175 into a linear reciprocating motion. That is, the rotational motion of the motor 175 may be converted into the linear reciprocating motion of a structure fixed to the rotary unit 176. For example, the rotary unit 176 may be implemented by a ball screw including a shaft and a nut which is fastened with the shaft, but is not limited thereto.

The motor 175 and the rotary unit 176 interwork with the link unit 171 to lift and lower the display unit DP. The link unit 171 is formed with a link structure to receive the driving force from the motor 175 and the rotary unit 176 to be repeatedly folded or unfolded.

Specifically, when the display unit DP is wound, the motor 175 is driven so that the structure of the rotary unit 176 may perform the linear motion. That is, a part of the rotary unit 176 to which one end of the second link 171b is coupled may perform the linear motion. Therefore, one end of the second link 171b moves to the motor 175 and the plurality of links 171a and 171b is folded so that the height of the link unit 171 may be lowered. Further, while the plurality of links 171a and 171b is folded, the head bar 172 coupled to the first link 171a is also lowered and one end of the display unit DP coupled to the head bar 172 is also lowered.

When the display unit DP is unwound, the motor 175 is driven so that the structure of the rotary unit 176 may perform linear motion. That is, a part of the rotary unit 176 to which one end of the second link 171b is coupled may perform the linear motion. Therefore, one end of the second link 171b moves to be away from the motor 175 and the plurality of links 171a and 171b is unfolded so that the height of the link unit 171 may be increased. Further, while the plurality of links 171a and 171b is unfolded, the head bar 172 coupled to the first link 171a is also lifted and the display unit DP coupled to the head bar 172 is also lifted.

Accordingly, when the display unit DP is fully wound around the outer roller 161, the link unit 171 of the lifting unit 170 maintains a folded state. That is, when the display unit DP is fully wound around the outer roller 161, the lifting unit 170 may have a smallest height. In contrast, when the display panel 120 is fully unwound, the link unit 171 of the lifting unit 170 maintains a stretched state. That is, when the display unit DP is fully unwound, the lifting unit 170 may have a largest height.

In the meantime, when the display unit DP is wound, the outer roller 161 may rotate and the display unit DP may be wound around the outer roller 161. Referring to FIG. 3, a lower edge of the display unit DP is coupled to the outer roller 161. When the outer roller 161 rotates in a first direction DR1, that is, a clockwise direction, the display unit DP may be wound while a rear surface of the display unit DP is in close contact with a surface of the outer roller 161.

When the display unit DP is unwound, the outer roller 161 may rotate and the display unit DP may be unwound from the outer roller 161. For example, referring to FIG. 3, when the outer roller 161 rotates in a second direction DR2, that is, in a counterclockwise direction, the display unit DP which is wound around the outer roller 161 is unwound from the outer roller 161 to be disposed at the outside of the housing unit HP.

In some exemplary embodiments, a driving unit MP having another structure other than the above-described driving unit MP may be applied to the display device 100. That is, as long as the display unit DP is wound and unwound, the above-described configuration of the roller unit 160 and the lifting unit 170 may be modified, some configurations may be omitted, or another configuration may be added.

<Display Unit>

Figure 4A:
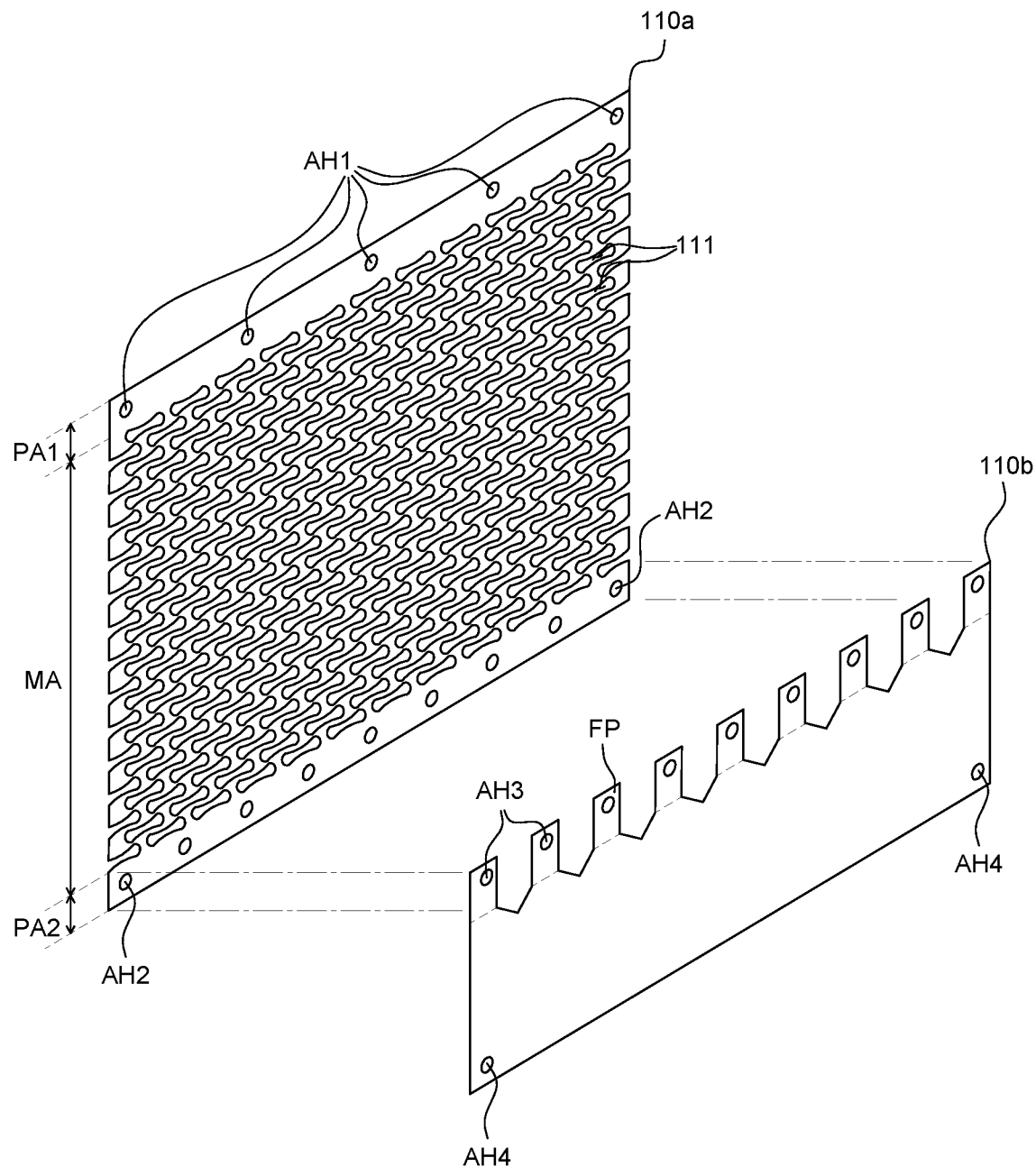
FIG. 4A is an exploded perspective view for explaining a first cover and a second cover of a display device according to an exemplary embodiment of the present disclosure.
Figure 4B:
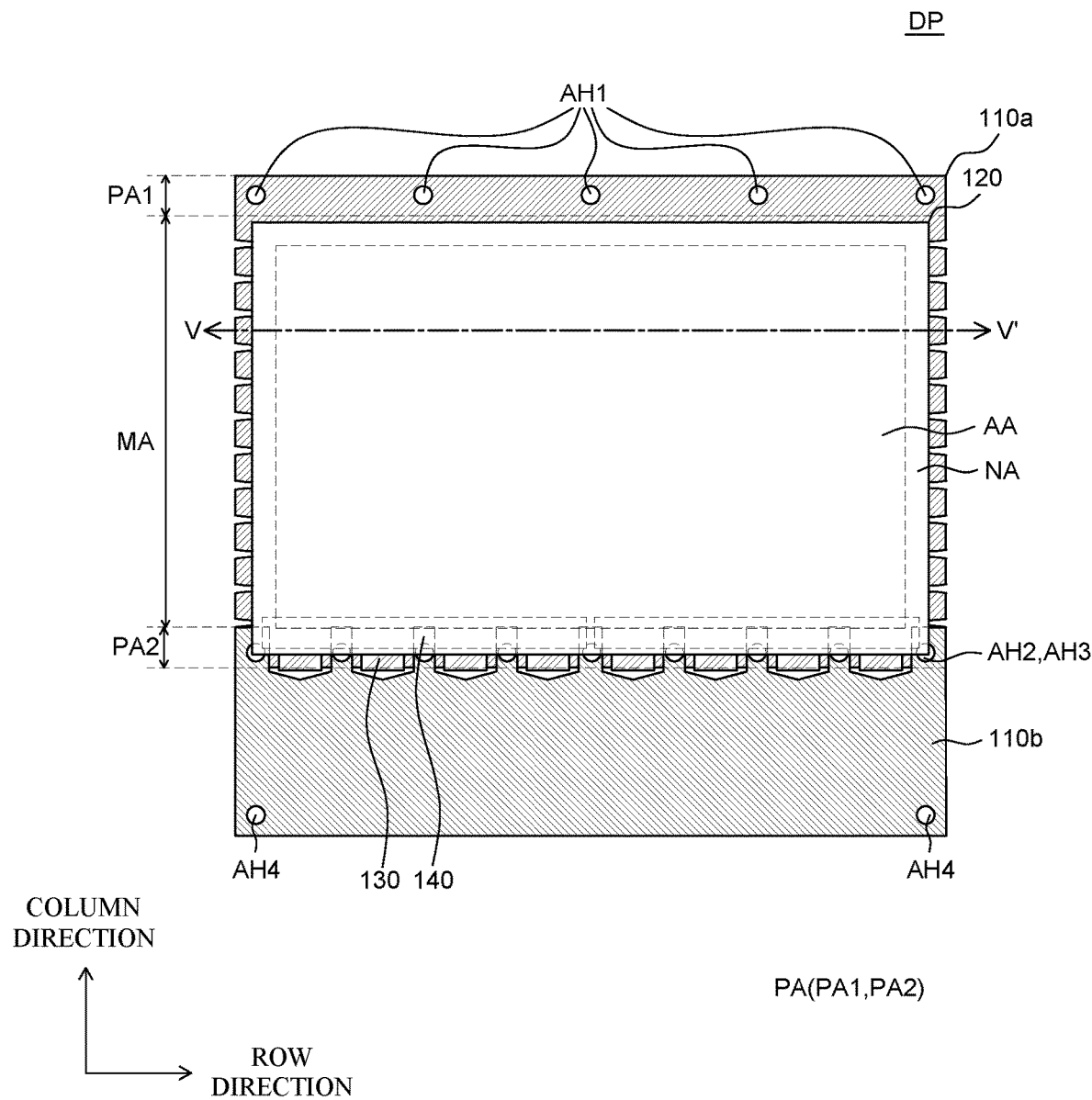
FIG. 4B is a plan view of a display unit of a display device according to an exemplary embodiment of the present disclosure.
Figure 5:
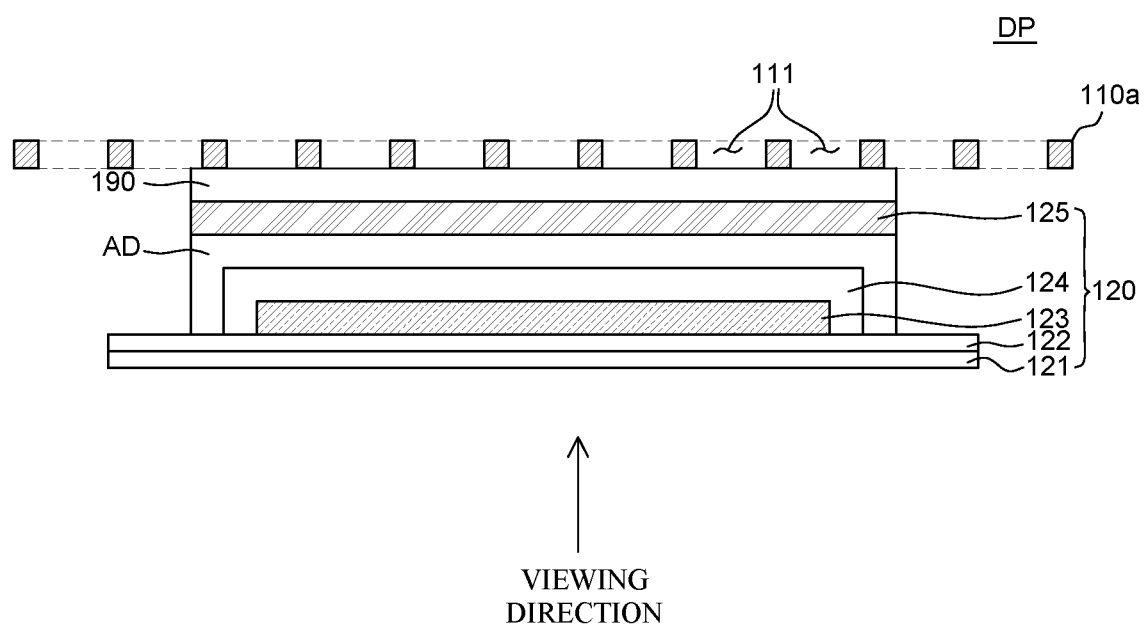
FIG. 5 is a cross-sectional view taken along the line V-V' of FIG. 4B device according to an exemplary embodiment of the present disclosure.

FIG. 4A is an exploded perspective view for explaining a first cover and a second cover of a display device according to an exemplary embodiment of the present disclosure. FIG. 4B is a plan view of a display unit of a display device according to an exemplary embodiment of the present disclosure. FIG. 5 is a cross-sectional view taken along the line V-V' of FIG. 4B according to an exemplary embodiment of the present disclosure.

Referring to FIGS. 4A, 4B, and 5, the display unit DP includes a first cover 110a, a display panel 120, a plurality of flexible films 130, a first printed circuit board 140, a second cover 110b, and an adhesive unit 190. However, it is not limited thereto and the display unit DP may be defined to include only the display panel 120, the plurality of flexible films 130, and the first printed circuit board 140.

Referring to FIGS. 4A and 4B, the first cover 110a is disposed on a rear surface of the display panel 120 to support the display panel 120. The first cover 110a is disposed on the rear surface of the display panel 120 so that the first cover may be referred to as a back cover. A size of the first cover 110a may be larger than a size of the display panel 120. The first cover 110a may protect other configurations of the display unit DP from the outside.

Even though the first cover 110a is formed of a material having a rigidity, at least a part of the first cover 110a may have a flexibility to be wound or unwound together with the display panel 120. For example, the first cover 110a may be formed of a metal material such as steel use stainless (SUS) or invar or plastic. However, if the material of the first cover 110a satisfies physical conditions, such as a thermal strain, a radius of curvature, and a rigidity, the material may be diversely changed depending on the design, and is not limited thereto.

The first cover 110a may be fastened with the head bar 172 and the second cover 110b.

The first cover 110a includes a plurality of support areas PA and a malleable area MA. The plurality of support areas PA is an area where a plurality of openings 111 is not disposed and the malleable area MA is an area where a plurality of openings 111 is disposed. Specifically, the first cover 110a includes a first support area PA1, a malleable area MA, and a second support area PA2 and the first support area PA1, the malleable area MA, and the second support area PA2 are sequentially disposed from an uppermost end of the first cover 110a. In this case, since the first cover 110a is wound or unwound in a column direction, the plurality of support areas PA and the malleable area MA may be disposed along the column direction.

The first support area PA1 of the first cover 110a is an uppermost area of the first cover 110a and is fastened with the head bar 172. The first support area PA1 may include first fastening holes AH1 to be fastened with the head bar 172. For example, screws which pass through the head bar 172 and the first fastening holes AH1 are disposed so that the head bar 172 is fastened with the first support area PA1. As the first support area PA1 is fastened with the head bar 172, when the link unit 171 which is fastened with the head bar 172 is lifted or lowered, the first cover 110a may be also lifted or lowered together, and the display panel 120 which is attached to the first cover 110a may be also lifted or lowered. Even though five first fastening holes AH1 are illustrated in FIGS. 4A and 4B, the number of first fastening holes AH1 is not limited thereto. Further, even though it has been described that the first cover 110a is fastened with the head bar 172 using the first fastening holes AH1, it is not limited thereto and the first cover 110a and the head bar 172 may be fastened with each other without using a separate fastening hole.

The malleable area MA of the first cover 110a is an area extending from the first support area PA1 to a lower side of the first cover 110a. The malleable area MA is an area in which a plurality of openings 111 are disposed and the display panel 120 is attached. Specifically, the malleable area MA is an area which is wound around or unwound from the outer roller 161 together with the display panel 120. The malleable area MA may overlap at least the display panel 120 among other configurations of the display unit DP.

The second support area PA2 of the first cover 110a is an area which extends from the malleable area MA and is a lowermost side of the first cover 110a. One end of the display panel 120 is disposed in the second support area PA2. For example, a pad area which is a non-active area at one end of the display panel 120 may be disposed in the second support area PA2.

Referring to FIG. 4A, second fastening holes AH2 are disposed in the second support area PA2. Even though nine second fastening holes AH2 are illustrated in FIG. 4A, the number of second fastening holes AH2 is illustrative and is not limited thereto.

In the meantime, in the first support area PA1 and the second support area PA2, the plurality of openings 111 as formed in the malleable area MA are not formed. Specifically, in the first support area PA1 and the second support area PA2, the first fastening holes AH1 and the second fastening holes AH2 are formed, but the plurality of openings 111 as formed in the malleable area MA are not formed. Further, the first fastening holes AH1 and the second fastening holes AH2 have different shapes from that of the plurality of openings 111.

The first support area PA1 is an area fixed to the head bar 172 and the second support area PA2 is an area where one end of the display panel 120, the plurality of flexible films 130, and the first printed circuit board 140 are supported and may have a rigidity larger than that of the malleable area MA. Further, as the first support area PA1 and the second support area PA2 have the rigidity, the first support area PA1 and the second support area PA2 may be firmly fixed to the head bar 172 and the second cover 110b. The second support area PA2 maintains the pad area at one end of the display panel 120 and the first printed circuit board 140 to be flat to protect the pad area and the first printed circuit board 140 of the display panel 120. Therefore, the display unit DP is fixed to the head bar 172 of the driving unit MP to move to the inside or the outside of the housing unit HP in accordance with the operation of the driving unit MP and protect the pad area and the first printed circuit board 140 at one end of the display panel 120.

In the meantime, in FIG. 4A, even though it is illustrated that the plurality of support areas PA and the malleable area MA of the first cover 110a are sequentially disposed along the column direction, when the first cover 110a is wound in the row direction, the plurality of support areas PA and the malleable area MA may be disposed along a row direction.

When the display unit DP is wound or unwound, the plurality of openings 111 disposed in the malleable area MA of the first cover 110a may be deformed by a stress which is applied to the display unit DP. Specifically, when the display unit DP is wound or unwound, the malleable area MA of the first cover 110a may be deformed as the plurality of openings 111 contracts or expands. Further, as the plurality of openings 111 contracts or expands, a slip phenomenon of the display panel 120 disposed on the malleable area MA of the first cover 110a is reduced so that the stress which is applied to the display panel 120 may be reduced.

When the display panel 120 and the first cover 110a are wound, a difference between a length of the display panel 120 which is wound around the outer roller 161 and a length of the first cover 110a which is wound around the outer roller 161 may be caused due to the difference of radii of curvature of the display panel 120 and the first cover 110a. For example, when the first cover 110a and the display panel 120 are wound around the outer roller 161, a length of the first cover 110a required for being wound around the outer roller 161 once may be different from a length of the display panel 120 required for being wound around the outer roller 161 once. That is, since the display panel 120 is disposed to be closer to the outside of the outer roller 161 than the first cover 110a, a length of the display panel 120 required to be wound around the outer roller 161 once may be larger than a length of the first cover 110a required to be wound around the outer roller 161 once. As described above, the winding lengths of the first cover 110a and the display panel 120 are different from each other due to the difference of radii of curvature at the time of winding the display unit DP and the display panel 120 attached to the first cover 110a may slide to move from its original position. In this case, a phenomenon that the display panel 120 slides from the first cover 110a due to the stress and the difference of radii of curvature caused by the winding may be defined as a slip phenomenon.

When the slip phenomenon is excessively increased, the display panel 120 may be detached from the first cover 110a or failures such as cracks may be caused.

In this case, in the display device 100 according to an exemplary embodiment of the present disclosure, even though the display unit DP is wound or unwound and a stress is applied to the display unit DP, the plurality of openings 111 of the first cover 110a are flexibly deformed to relieve the stress applied to the first cover 110a and the display panel 120. For example, when the first cover 110a and the display panel 120 are wound around the outer roller 161 along the column direction, a stress which deforms the first cover 110a and the display panel 120 in a vertical direction may be applied. In this case, the plurality of openings 111 of the first cover 110a may extend in a vertical direction of the first cover 110a and the length of the first cover 110a may be flexibly deformed. Therefore, the difference in lengths of the first cover 110a and the display panel 120 caused by the difference in radii of curvature during the process of winding the first cover 110a and the display panel 120 may be compensated by the plurality of openings 111 of the first cover 110a. Further, the plurality of openings 111 are deformed during the process of winding the first cover 110a and the display panel 120 so that a stress which is applied to the display panel 120 from the first cover 110a may also be relieved.

The second cover 110b is fastened with the first cover 110a and the outer roller 161 to connect the first cover 110a and the outer roller 161. The second cover 110b connects the first cover 110a and the outer roller 161 by the above-described method and finally connects the display panel 120 disposed in the first cover 110a to the outer roller 161. However, it is not limited thereto so that as long as the second cover 110b is connected to the first cover 110a and the outer roller 161, a shape or a connection method of the second cover 110b may vary in various ways depending on the design, but is not limited thereto.

One end of the second cover 110b which is an uppermost area of the second cover 110b may overlap one end of the first cover 110a. For example, one end of the second cover 110b may overlap the second support area PA2. One end of the second cover 110b overlaps a part of the first cover 110a to be connected or one end of the second cover 110b is connected to the part of the first cover 110a using a connection member, but is not limited thereto.

The second cover 110b may include a plurality of fastening units FP overlapping the first cover 110a. The plurality of fastening units FP are disposed at one end of the second cover 110b. Further, in the plurality of fastening units FP, a plurality of third fastening holes AH3 to be fastened with the first cover 110a may be disposed. The plurality of fastening units FP in which the plurality of third fastening holes AH3 are disposed are spaced apart from each other and a space which allows the plurality of flexible films 130 to be bent may be ensured between the plurality of fastening units FP. Even though nine third fastening holes AH3 are illustrated in FIG. 4A, the number of third fastening holes AH3 is illustrative and is not limited thereto.

In FIG. 4A, it is described that the second fastening holes AH2 and the third fastening holes AH3 to be fastened with the first cover 110a and the second cover 110b are disposed in the second support area PA2 of the first cover 110a and one end of the second cover 110b, respective. However, the first cover 110a and the second cover 110b may be fixed to each other without using a separate fastening hole.

In the meantime, when the second support area PA2 and the plurality of fastening units FP are wound around the outer roller 161, an outer circumferential surface of the outer roller 161 which overlaps the second support area PA2 and the plurality of fastening units FP may be a flat portion 161F. Therefore, the second support area PA2 may always maintain the flat state regardless of the wound or unwound state to the outer roller 161 and the pad area at one end of the display panel 120 and the first printed circuit board 140 disposed in the second support area PA2 may also maintain the flat state.

An area from one end to the other end of the second cover 110b is an area which extends to dispose the active area AA of the display panel 120 at the outside of the housing unit HP. For example, when the first cover 110a and the display panel 120 are fully unwound, an area from the other end of the second cover 110b which is fixed to the outer roller 161 to one end of the second cover 110b in which the plurality of flexible films 130 and the first printed circuit board 140 are disposed may be disposed in the housing unit HP. The malleable area MA and the first support area PA1 in which the active area AA of the display panel 120 is disposed may be disposed at the outside of the housing unit HP. That is, an area from the other end of the second cover 110b fixed to the outer roller 161 to at least a part of an end of the second cover 110b and the second support area PA2 may be disposed in the housing unit HP.

The other end of the second cover 110b is a lowermost area of the second cover 110b and is fastened with the outer roller 161. A fourth fastening hole AH4 may be formed at the other end of the second cove 110b to be fastened with the outer roller 161. For example, a fastening member which passes through the outer roller 161 and the fourth fastening holes AH4 is disposed to fasten the outer roller 161 and the other end of the second cover 110b with each other. As the other end of the second cover 110b is fastened with the outer roller 161, the display panel 120, the first cover 110a, and the second cover 110b may be wound around or unwound from the outer roller 161. Even though two fourth fastening holes AH4 are illustrated in FIG. 4A, the number of fourth fastening holes AH4 is not limited thereto.

In the meantime, in the second cover 110b, the plurality of openings 111 as formed in the malleable area MA of the first cover 110a is not formed. Specifically, the third fastening holes AH3 and the fourth fastening holes AH4 are formed at one end and the other end of the second cover 110b respectively, but the plurality of openings 111 as formed in the malleable area MA of the first cover 110a are not formed. Further, the third fastening hole AH3 and the fourth fastening hole AH4 have different shapes from that of the plurality of openings 111.

The second cover 110b may be formed of a flexible material to be wound around or unwound from the roller. For example, the second cover 110b may be formed of a plastic material such as PET. However, if the material of the second cover 110b satisfies physical conditions, such as a thermal strain, a radius of curvature, and a rigidity, the material may be diversely changed depending on the design, and is not limited thereto.

Referring to FIGS. 4B and 5, the display panel 120 is disposed on one surface of the first cover 110a. The display panel 120 is disposed in the malleable area MA, on one surface of the first cover 110a. The display panel 120 is a panel for displaying images to a user. The display panel 120 may include a display element which displays images, a driving element which drives the display element, and wiring lines which transmit various signals to the display element and the driving element.

The display element may be defined in different manners depending on the type of the display panel 120. For example, when the display panel 120 is an organic light emitting display panel 120, the display element may be an organic light emitting diode which includes an anode, an organic light emitting layer, and a cathode. For example, when the display panel 120 is a liquid crystal display panel, the display element may be a liquid crystal display element. Hereinafter, even though the display panel 120 is assumed as an organic light emitting display panel, the display panel 120 is not limited to the organic light emitting display panel. Further, since the display device 100 according to the exemplary embodiment of the present disclosure is a rollable display device 100, the display panel 120 may be implemented as a flexible display panel 120 to be wound around or unwound from the outer roller 161.

The display panel 120 includes an active area AA and a non-active area NA.

The active area AA is an area where images are displayed in the display panel 120. In the active area AA, a plurality of sub pixels which configures the plurality of pixels and a driving circuit for driving the plurality of sub pixels may be disposed. The plurality of sub pixels are minimum units which configure the active area AA and a display element may be disposed in each of the plurality of sub pixels. For example, an organic light emitting diode which includes an anode, an organic light emitting layer, and a cathode may be disposed in each of the plurality of sub pixels, but it is not limited thereto. Further, a driving circuit for driving the plurality of sub pixels may include a driving element and a wiring line. For example, the driving circuit may be configured by a thin film transistor, a storage capacitor, a gate line, and a data line, but is not limited thereto.

The non-active area NA is an area where no image is displayed. In the non-active area NA, various wiring lines and circuits for driving the organic light emitting diode of the active area AA are disposed. For example, in the non-active area NA, a link line which transmits signals to the plurality of sub pixels and driving circuits of the active area AA or a driving IC such as a gate driver IC or a data driver IC may be disposed, but the non-active area is not limited thereto.

In the meantime, the non-active area NA includes a pad area and a gate driving area.

The pad area is an area in which a plurality of pads is disposed. The plurality of pads are electrodes which electrically connect the plurality of flexible films 130 and the display panel 120 to each other so that the plurality of flexible films 130 and the display panel 120 are electrically connected by the plurality of pads. The pad area may be a non-active area NA which overlaps the second support area PA2 of the first cover 110a in the non-active area NA. However, the pad area may be formed in the other part of the non-active area NA depending on the arrangement of the plurality of flexible films 130, but is not limited thereto.

The gate driving area is an area where a gate driver is disposed. The gate driving area may be a non-active area NA at a left side and a right side of the active area AA. The gate driver outputs a gate voltage and an emission control voltage under the control of the timing controller to select a sub pixel in which a data voltage is charged through a wiring line such as a gate line or an emission control signal line and adjust an emission timing. Hereinafter, it is assumed that the gate driver is formed directly on the substrate 121 by a gate-driver in panel (GIP) method, but is not limited thereto. In this case, the gate driving area where the gate driver is disposed may also be referred to as a GIP area.

Referring to FIG. 5, the display panel 120 includes a substrate 121, a buffer layer 122, a pixel unit 123, an encapsulation layer 124, and an encapsulation substrate 125.

The substrate 121 is a base member which supports various components of the display panel 120 and may be configured by an insulating material. The substrate 121 may be formed of a material having a flexibility to allow the display panel 120 to be wound or unwound. For example, the substrate 121 may be formed of a plastic material such as polyimide.

The buffer layer 122 is disposed on a top surface of the substrate 121. The buffer layer 122 may suppress moisture and/or oxygen which penetrates from the outside of the substrate 121 from being spread. The buffer layer 122 may be formed of an inorganic material, for example, may be configured by a single layer or a double layer of silicon oxide SiOx and silicon nitride SiNx, but is not limited thereto.

The pixel unit 123 is disposed on upper surfaces of the substrate 121 and the buffer layer 122. The pixel unit 123 includes a plurality of organic light emitting diodes and a circuit for driving the plurality of organic light emitting diodes. The pixel unit 123 may be disposed so as to correspond to the active area AA.

In the meantime, the display panel 120 may be configured by a top emission type or a bottom emission type, depending on an emission direction of light which is emitted from the organic light emitting diode.

According to the top emission type, light emitted from the organic light emitting diode is emitted to an upper portion of the substrate 121 on which the organic light emitting diode is formed. In the case of the top emission type, a reflective layer may be formed below the anode to allow the light emitted from the organic light emitting diode to travel to the upper portion of the substrate 121, that is, toward the cathode.

According to the bottom emission type, light emitted from the organic light emitting diode is emitted to a lower portion of the substrate 121 on which the organic light emitting diode is formed. In the case of the bottom emission type, the anode may be formed only of a transparent conductive material and the cathode may be formed of the metal material having a high reflectance to allow the light emitted from the organic light emitting diode to travel to the lower portion of the substrate 121.

Hereinafter, for the convenience of description, the description will be made by assuming that the display device 100 according to an exemplary embodiment of the present disclosure is a bottom emission type display device, but it is not limited thereto.

The encapsulation layer 124 is disposed to cover the pixel unit 123. The encapsulation layer 124 seals the organic light emitting diode of the pixel unit 123. The encapsulation layer 124 may protect the organic light emitting diode of the pixel unit 123 from moisture, oxygen, and impacts of the outside. The encapsulation layer 124 may be formed by alternately laminating a plurality of inorganic layers and a plurality of organic layers. For example, the inorganic layer may be formed of an inorganic material such as silicon nitride ($SiN_x$), silicon oxide ($SiO_x$), and aluminum oxide ($AlO_x$) and the organic layer may be formed of epoxy or acrylic polymer, but they are not limited thereto.

The encapsulation substrate 125 is disposed on the encapsulation layer 124. Specifically, the encapsulation substrate 125 is disposed between the encapsulation layer 124 and the first cover 110a. The encapsulation substrate 125 may protect the organic light emitting diode of the pixel unit 123 together with the encapsulation layer 124. The encapsulation substrate 125 may protect the organic light emitting diode of the pixel unit 123 from moisture, oxygen, and impacts of the outside. For example, the encapsulation substrate 125 may be formed of a material having a high modulus of approximately 200 to 900 MPa. The encapsulation substrate 125 may be formed of a metal material, which has a high corrosion resistance and is easily processed in the form of a foil or a thin film, such as aluminum (Al), nickel (Ni), chromium (Cr), and an alloy material of iron (Fe) and nickel. Therefore, as the encapsulation substrate 125 is formed of a metal material, the encapsulation substrate 125 may be implemented as an ultra-thin film and provide a strong resistance against external impacts and scratches.

An adhesive layer AD is disposed between the encapsulation layer 124 and the encapsulation substrate 125. The adhesive layer AD may bond the encapsulation layer 124 and the encapsulation substrate 125 to each other. The adhesive layer AD is formed of a material having an adhesiveness and may be a thermosetting or natural curable type adhesive. For example, the adhesive layer AD may be formed of an optical clear adhesive (OCA) or a pressure sensitive adhesive (PSA), but is not limited thereto.

In the meantime, the adhesive layer AD may be disposed to enclose the encapsulation layer 124 and the pixel unit 123. That is, the pixel unit 123 may be sealed by the buffer layer 122 and the encapsulation layer 124, and the encapsulation layer 124 and the pixel unit 123 may be sealed by the buffer layer 122 and the adhesive layer AD. The adhesive layer AD may protect the organic light emitting diode of the pixel unit 123 from moisture, oxygen, and impacts of the outside together with the encapsulation layer 124 and the encapsulation substrate 125. In this case, the adhesive layer AD may further include an absorbent. The moisture absorbent may be particles having hygroscopicity and absorb moisture and oxygen from the outside to reduce permeation of the moisture and oxygen into the pixel unit 123.

Referring to FIG. 5, an adhesive unit 190 which bonds the display panel 120 and the first cover 110a is disposed. The adhesive unit 190 is disposed between the display panel 120 and the first cover 110a to bond the display panel 120 and the first cover 110a. The adhesive unit 190 may bond the display panel 120 and the first cover 110a in the manner of bonding the encapsulation substrate 125 and the first cover 110a. The adhesive unit 190 may be disposed between the encapsulation substrate 125 and the first cover 110a and bond the encapsulation substrate 125 and the first cover 110a. The adhesive unit 190 will be described in more detail below with reference to FIG. 6.

Even though not illustrated in the drawing, a polarizer may be disposed on a rear surface of the display panel 120. The polarizer selectively transmits light to reduce the reflection of external light which is incident onto the display panel 120. Specifically, the display panel 120 includes various metal materials applied to the semiconductor element, the wiring line, and the organic light emitting diode. Therefore, the external light incident onto the display panel 120 may be reflected from the metal material so that the visibility of the display device 100 may be reduced due to the reflection of the external light. Therefore, when the polarizer is disposed, the polarizer suppresses the reflection of the external light to increase the outdoor visibility of the display device 100. However, the polarizer may be omitted depending on an implementation example of the display device 100.

Referring to FIG. 4B, a plurality of flexible films 130 are disposed at one end of the display panel 120. The plurality of flexible films 130 are a film in which various components are disposed on a base film having a softness to supply a signal to the plurality of sub pixels which configures the plurality of pixels of the active area AA and the driving circuits and may be electrically connected to the display panel 120. One end of the plurality of flexible films 130 is disposed in the non-active area NA of the display panel 120 to supply a power voltage or a data voltage to the plurality of sub pixels and the driving circuits of the active area AA. In the meantime, even though eight flexible films 130 are illustrated in FIG. 4B, the number of flexible films 130 may vary depending on the design, but is not limited thereto.

A driving IC such as a gate driver IC or a data driver IC may be disposed on the base film of the plurality of flexible films 130. The driving IC is a component which processes data for displaying images and a driving signal for processing the image. The driving IC may be disposed by a chip on glass (COG), a chip on film (COF), or a tape carrier package (TCP) depending on a mounting method. However, for the convenience of description, in FIG. 4B, it is illustrated that the driving IC is mounted on the plurality of flexible films 130 by a chip on film technique, but is not limited thereto.

In the meantime, the plurality of flexible films 130 are components in which a base film and various driving ICs which control data for displaying images on the base film are disposed to display images. The plurality of flexible films 130 are electrically connected to the pad area at one end of the display panel 120 to be bent toward a rear surface of the first cover 110a. One end of the plurality of flexible films 130 is connected to one end of the display panel 120 on one surface of the first cover 110a and the other end of the plurality of flexible films 130 may be disposed at an opposite surface of the one surface of the first cover 110a, but is not limited thereto.

Referring to FIG. 4B, the first printed circuit board 140 is disposed on the rear surface of the first cover 110a to be connected to the plurality of flexible films 130. That is, the first printed circuit board 140 is disposed on the rear surface of the first back cover 110a to be electrically connected to the plurality of flexible films 130. The first printed circuit board 140 is a component which supplies signals to the driving IC of the plurality of flexible films 130. Various components may be disposed in the first printed circuit board 140 to supply various signals such as a driving signal or a data signal to the driving IC. In the meantime, even though two first printed circuit boards 140 are illustrated in FIG. 4B, the number of first printed circuit boards 140 may vary depending on the design and is not limited thereto.

Even though not illustrated in FIG. 4B, a second printed circuit board which is connected to the first printed circuit board 140 may be further disposed. At this time, the first printed circuit board 140 may be referred to as a source printed circuit board (S-PCB) on which the data driver is mounted and the second printed circuit board connected to the first printed circuit board 140 may be referred to as a control printed circuit board (C-PCB) on which a timing controller or the like is mounted. The second printed circuit board will be described below with reference to FIGS. 6 and 7.

Hereinafter, an outer roller 161 and an inner roller 163 will be described in more detail with reference to FIGS. 6 and 7.

<Outer Roller and Inner Roller>

Figure 6:
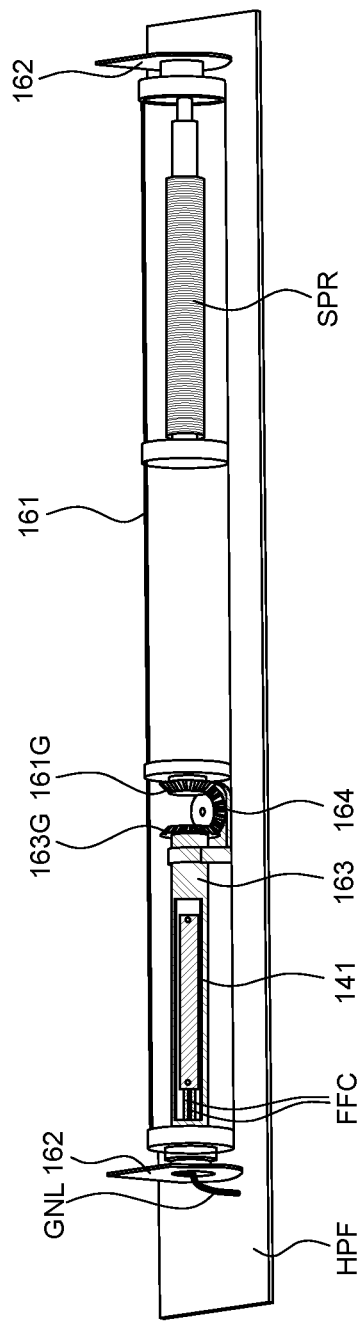
FIG. 6 is a perspective view of an outer roller and an inner roller of a display device according to an exemplary embodiment of the present disclosure.

FIG. 6 is a perspective view of an outer roller and an inner roller of a display device according to an exemplary embodiment of the present disclosure. FIG. 7 is an enlarged view illustrating an inner roller of a display device according to an exemplary embodiment of the present disclosure. In FIGS.

6 and 7, for the convenience of description, it is illustrated that parts of the outer roller 161 and the inner roller 163 are removed to see the insides of the outer roller 161 and the inner roller 163.

Figure 7:
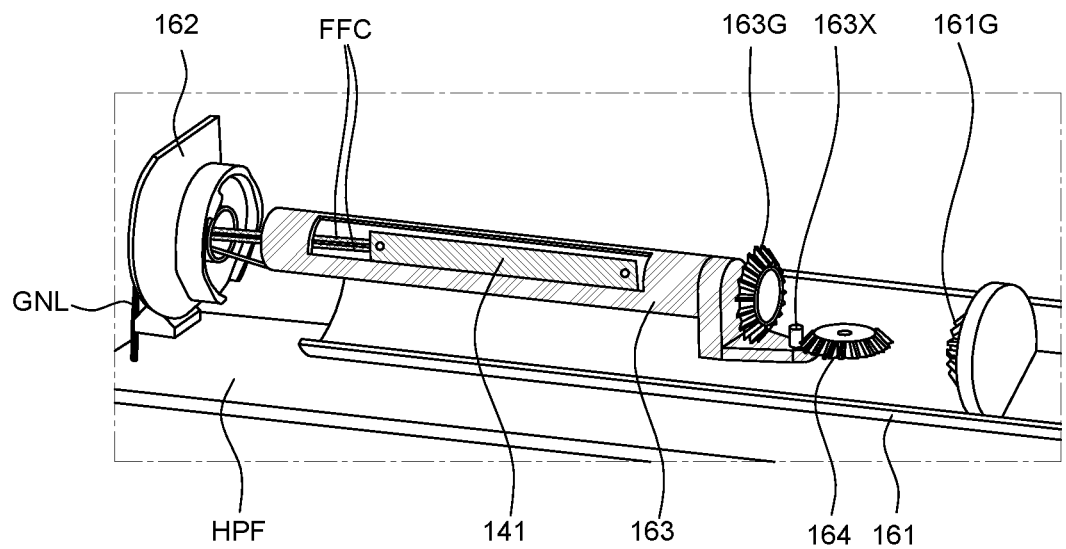
FIG. 7 is an enlarged view illustrating an inner roller of a display device according to an exemplary embodiment of the present disclosure.

Referring to FIGS. 6 and 7, the display device 100 according to the exemplary embodiment of the present disclosure includes an outer roller 161, an inner roller 163, a cable FFC, a ground line GNL, an outer roller gear 161G, an inner roller gear 163G, an intermediate gear 164, and a spring SPR.

The outer roller 161 is configured to wind or unwind the display unit DP. In the outer roller 161, a partition which separates an inner space to couple components accommodated therein may be disposed.

The inner roller 163 may be accommodated in the outer roller 161. Specifically, the inner roller 163 may be disposed between a center portion of the outer roller 161 and one end of the outer roller 161.

The second printed circuit board 141 may be accommodated in the inner roller 163 to be fixed. The second printed circuit board 141 is a control printed circuit board (C-PCB) in which a timing controller is mounted and is connected to the first printed circuit board 140 to be electrically connected to the display panel 120.

A plurality of cables FFC may be accommodated in the inner roller 163. The plurality of cables FFC are connected to the second printed circuit board 141 and applies a power or a signal from the outside to the second printed circuit board 141.

Referring to FIGS. 6 and 7, the plurality of cables FFC may extend to the outside by means of an opening at one ends of the outer roller 161 and the inner roller 163.

At this time, the plurality of cables FFC may be disposed so as to be spaced apart from the inner roller 163. That is, the plurality of cables FFC may be disposed to have a length so as not to be in contact with an inner circumferential surface of the inner roller 163.

The ground line GNL may be disposed on an outer circumferential surface of the inner roller 163. The ground line GNL electrically connects the inner roller 163 and the housing unit HP. Specifically, the ground line GNL is connected to a bottom surface HPF of the housing unit HP to ground the inner roller 163.

The outer roller 161 may include an outer roller gear 161G. Specifically, the outer roller gear 161G may be disposed in the outer roller 161 so as to correspond to a space in which the inner roller 163 is disposed. As illustrated in FIGS. 6 and 7, the outer roller gear 161G is fixed to the inside of the outer roller 161 and may rotate together with the outer roller 161 by the rotation of the outer roller 161.

The inner roller 163 includes an inner roller gear 163G. Specifically, as illustrated in FIGS. 6 and 7, the inner roller gear 163G is fixed to one end of the inner roller. Therefore, the inner roller 163 may rotate together with the inner roller gear 163G by the rotation of the inner roller gear 163G.

The intermediate gear 164 is disposed between the outer roller gear 161G and the inner roller gear 163G. The intermediate gear 164 interworks with the outer roller gear 161G and the inner roller gear 163G. Therefore, the intermediate gear 164 may interwork the rotation of the outer roller gear 161G with the rotation of the inner roller gear 163G. The intermediate gear 164 may be a power transmission gear which interworks the rotation of the outer roller 161 with the rotation of the inner roller gear 163G.

In the meantime, referring to FIG. 7, the inner roller 163 further includes an intermediate gear rotary shaft 163X. For example, the intermediate gear rotary shaft 163X may be disposed to extend to the inner circumferential surface of the outer roller 161 from one end of the inner roller 163 in which the inner roller gear 163G is disposed, but is not limited thereto.

A central axis of the intermediate gear 164 is correspondingly disposed in the intermediate gear rotary shaft 163X. Therefore, the intermediate gear 164 is coupled to be rotatable around the intermediate gear rotary shaft 163X.

Referring to FIG. 6, in an opposite side of the outer roller 161 in which the inner roller 163 is not disposed, the spring SPR is disposed. The spring SPR is configured to constantly maintain a tension which is applied to the display panel 120 when the outer roller 161 rotates.

Hereinafter, the outer roller gear 161G, the inner roller gear 163G, and the intermediate gear 164 will be described in more detail with reference to FIG. 8.

<Outer Roller Gear, Inner Roller Gear, and Intermediate Gear>

Figure 8:
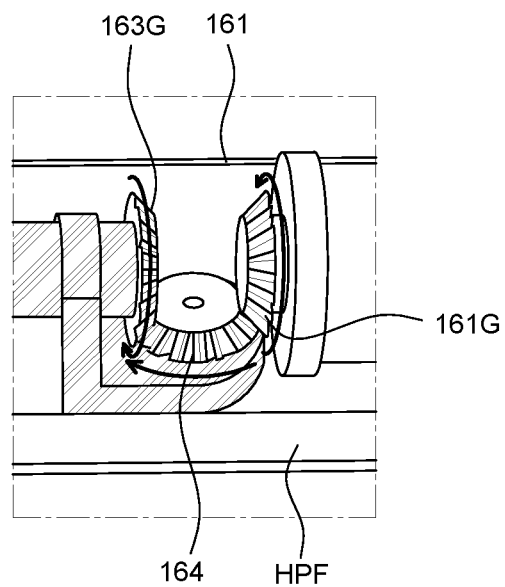
FIG. 8 is an enlarged view for explaining the coupling of an outer roller gear, an inner roller gear, and an intermediate gear of a display device according to an exemplary embodiment of the present disclosure.

FIG. 8 is an enlarged view for explaining the coupling of an outer roller gear, an inner roller gear, and an intermediate gear of a display device according to an exemplary embodiment of the present disclosure.

Referring to FIG. 8, in the display device 100 according to the exemplary embodiment of the present disclosure, when the display unit DP is wound or unwound, the outer roller 161 and the inner roller 163 rotate in opposite directions by the intermediate gear 164 which rotates in a direction perpendicular to a rotation direction of the outer roller gear 161G and the rotation direction of the inner roller gear 163G. That is, the inner roller 163 may be configured to reversely rotate with respect to the outer roller 161.

First, the outer roller gear 161G rotates in the same rotation direction as the outer roller 161 by the rotation of the outer roller 161. The intermediate gear 164 which interworks with the outer roller gear 161G rotates in a direction perpendicular to the rotation direction of the outer roller gear 161G. Next, the inner roller gear 163G which interworks with the intermediate gear 164 and is fixed to the inner roller 163 rotates in a direction perpendicular to the intermediate gear 164. At this time, the inner roller gear 163G rotates in an opposite direction to the rotation direction of the outer roller gear 161G.

Further, in the display device 100 according to the exemplary embodiment of the present disclosure, a gear ratio of the outer roller gear 161G and the intermediate gear 164 is one to one and a gear ratio of the intermediate gear 164 and the inner roller gear 163G may be one to one. Therefore, when the outer roller 161 rotates, the intermediate gear 164 may rotate by the same rotational amount and the inner roller 163 may rotate by the intermediate gear 164 in an opposite direction to the outer roller 161, by the same rotational amount.

Accordingly, when the outer roller 161 rotates, the inner roller 163 is configured to reversely rotate in an opposite direction by the rotational amount so that the second printed circuit board 141 accommodated in the inner roller 163 may be configured so as not to rotate with respect to the rotation of the outer roller 161. That is, the second printed circuit board 141 may be configured so as not to rotate by the rotation of the inner roller 163 when the outer roller 161 rotates.

Hereinafter, a first inner roller 163-1 and a second inner roller 163-2 will be described in more detail with reference to FIG. 9.

<First Inner Roller and Second Inner Roller>

Figure 9:
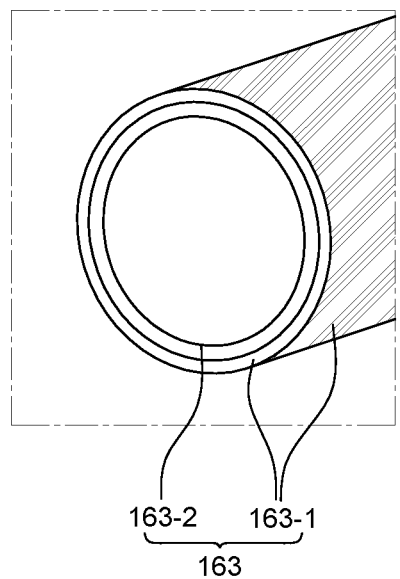
FIG. 9 is a cross-sectional perspective view for explaining a first inner roller and a second inner roller of a display device according to an exemplary embodiment of the present disclosure.

FIG. 9 is a cross-sectional perspective view for explaining a first inner roller 163-1 and a second inner roller 163-2 of a display device 100 according to an exemplary embodiment of the present disclosure. In FIG. 9, for the convenience of description, among various configurations of the display device 100, only the inner roller 163 is illustrated.

Referring to FIG. 9, the inner roller 163 includes a first inner roller 163-1 and a second inner roller 163-2.

The first inner roller 163-1 may be formed of a conductive material. For example, the first inner roller 163-1 may be formed of metal or the like. Therefore, the first inner roller 163-1 may be configured to support the second printed circuit board 141 with a rigidity and be connected to the ground line GNL to ground the second printed circuit board 141.

The second inner roller 163-2 is disposed on an inner circumferential surface of the first inner roller 163-1. That is, the second printed circuit board 141 may be accommodated in the second inner roller 163-2 of the inner roller 163.

The second inner roller 163-2 may be formed of an insulating material. Therefore, the second inner roller 163-2 may insulate between the first inner roller 163-1 and the second printed circuit board 141.

Generally, in the rollable display device, various wiring lines which extend from the outside of the printed circuit board and the display device to be connected to the printed circuit board in the roller are accommodated in the roller. However, in the display device of the related art, the wiring lines may be tangled by the rotation of the roller so that there is a problem in that it is difficult to smoothly drive the display device.

Therefore, in the display device 100 according to the exemplary embodiment of the present disclosure, the inner roller 163 which accommodates the second printed circuit board 141 and is connected to the cable FFC is configured to reversely rotate with respect to the outer roller 161. As a result, the second printed circuit board 141 is configured so as not to rotate when the outer roller 161 rotates. Accordingly, the plurality of cables FFC which is connected to the second printed circuit 141 may not rotate and the tangle issue of the cable FFC may be also improved. Therefore, in the display device 100 according to the exemplary embodiment of the present disclosure, the inner roller 163 is configured to reversely rotate with respect to the outer roller 161 so that the movement of the inner roller 163 during the winding and unwinding of the display device 100 may be restricted and the tangle of the cable FFC which is inserted into the inner roller 163 may be minimized.

In the meantime, in the display device of the related art, in order to solve the tangle issue of various wiring lines which are inserted into the roller, the wiring lines are disposed to have length, that is, a margin enough to drive the display device even though the wiring lines are tangled. However, the wiring lines may be in contact with the inner circumferential surface of the roller by the marginal length. Therefore, the roller which is formed of a metal material is in contact with the wiring line so that the electromagnetic inference (EMI) noise may be caused in the wiring line.

In contrast, in the display device 100 according to the exemplary embodiment of the present disclosure, when the display device 100 is wound or unwound, the cable FFC which is inserted into the inner roller 163 is disposed to be spaced apart from the inner roller 163, that is, the second inner roller 163-1. Accordingly, generation of the electromagnetic inference noise may be minimized Specifically, in the display device 100 according to the exemplary embodiment of the present disclosure, the second printed circuit board 141 is configured so as not to rotate when the outer roller 161 rotates so that the plurality of cables FFC which is connected to the second printed circuit board 141 is not rotated. Therefore, a marginal length in consideration of the entangling of the cables FFC may not be added. Therefore, the plurality of cables FFC may be disposed to be spaced apart from the outer circumferential surface of the inner roller 163 so as not to be in contact with the outer circumferential surface without having a marginal length. Accordingly, in the display device 100 according to the exemplary embodiment of the present disclosure, when the display device 100 is wound or unwound, the cable FFC which is inserted into the inner roller 163 is disposed to be spaced apart from the inner roller 163, thereby minimizing generation of the electromagnetic inference noise.

The exemplary embodiments of the present disclosure can also be described as follows:

According to an aspect of the present disclosure, a display device includes a display unit which includes a display panel and a back cover supporting a rear surface of the display panel; an external roller configured to wind or unwind the display unit; an inner roller which is accommodated in the outer roller; and an intermediate gear which interworks the rotation of the outer roller with the rotation of the inner roller, and when the display unit is wound or unwound, the outer roller and the inner roller rotate in opposite directions, by the intermediate gear.

The outer roller includes an outer roller gear which interworks with the intermediate gear, the inner roller includes an inner roller gear which interworks with the intermediate gear, and a rotation direction of the intermediate gear is perpendicular to the rotation direction of the outer roller gear and the rotation direction of the inner roller gear.

The intermediate gear may be a power transmission gear which interworks the rotation of the outer roller with the rotation of the inner roller gear.

A gear ratio of the outer roller gear and the intermediate gear may be one to one and a gear ratio of the intermediate gear and the inner roller gear may be one to one.

The inner roller may further include an intermediate gear rotary shaft.

The intermediate gear may be coupled to be rotatable around the intermediate gear rotary shaft.

The inner roller may be disposed between a center portion of the outer roller and one end of the outer roller in the outer roller.

The display device may further comprise a printed circuit board which is electrically connected to the display panel and is accommodated in the inner roller to be fixed to the inner roller.

The printed circuit board may be configured so as not to rotate by the rotation of the inner roller when the outer roller rotates.

The inner roller may include a first inner roller which is formed of a conductive material, and a second inner roller which is disposed on an inner circumferential surface of the first inner roller and is formed of an insulating material.

The printed circuit board may be accommodated in the second inner roller.

The display device may further comprise a housing unit which accommodates the display unit, and a ground line which electrically connects the first inner roller and the housing unit so as to ground the first inner roller.

The display device may further comprise a plurality of cables which is connected to the printed circuit board and applies a power or a signal from the outside to the printed circuit board.

The plurality of cables may be extended to the outside by means of openings of one ends of the outer roller and the inner roller.

The plurality of cables may be disposed to be spaced apart from the inner roller.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
    a display unit including a display panel and a back cover that supports a rear surface of the display panel;
    an outer roller configured to wind the display unit around the outer roller such that the display unit contacts the outer roller or unwind the display unit from the outer roller;
    an inner roller in the outer roller, the inner roller not contacting the display unit while the display unit is wound around the outer roller;
    an intermediate gear which interworks a rotation of the outer roller with a rotation of the inner roller; and
    a printed circuit board that is electrically connected to the display panel and is in the inner roller and fixed to the inner roller,
    wherein responsive to the display unit being wound or unwound, the outer roller and the inner roller rotate in opposite directions, by the intermediate gear,
    wherein the printed circuit board is configured to not rotate by the rotation of the inner roller responsive to rotation of the outer roller.

2. The display device according to claim 1, wherein the outer roller includes an outer roller gear which interworks with the intermediate gear, the inner roller includes an inner roller gear which interworks with the intermediate gear, and a rotation direction of the intermediate gear is perpendicular to a rotation direction of the outer roller gear and a rotation direction of the inner roller gear.

3. The display device according to claim 2, wherein the intermediate gear is a power transmission gear which interworks the rotation of the outer roller with the rotation of the inner roller gear.

4. The display device according to claim 2, wherein a gear ratio of the outer roller gear and the intermediate gear is one to one and a gear ratio of the intermediate gear and the inner roller gear is one to one.

5. The display device according to claim 2, wherein the inner roller further includes an intermediate gear rotary shaft and the intermediate gear is coupled to be rotatable around the intermediate gear rotary shaft.

6. The display device according to claim 1, wherein the inner roller is between a middle of the outer roller and one end of the outer roller in the outer roller.

7. The display device according to claim 1, wherein the inner roller includes:
    a first inner roller including a conductive material; and
    a second inner roller on an inner circumferential surface of the first inner roller, the second inner roller including an insulating material, and
    the printed circuit board is in the second inner roller.

8. The display device according to claim 7, further comprising:
    a housing unit that accommodates the display unit; and
    a ground line that electrically connects the first inner roller and the housing unit such that the first inner roller is grounded.

9. The display device according to claim 1, further comprising:
    a plurality of cables that are connected to the printed circuit board, the plurality of cables applying a power or a signal from outside the display device to the printed circuit board,
    wherein the plurality of cables extend to the outside through openings of one ends of the outer roller and the inner roller.

10. The display device according to claim 9, wherein the plurality of cables are spaced apart from the inner roller.

* * * * *